United States Patent [19]
Imai et al.

[11] Patent Number: 4,701,767
[45] Date of Patent: Oct. 20, 1987

[54] MAGNETIC RECORDING HEAD AND METHOD FOR MANUFACTURING

[75] Inventors: Motomasa Imai, Tokyo; Mitsuo Harata, Kawasaki; Takashi Takahashi, Tokyo; Kazuo Nishijima, Hadano, all of Japan

[73] Assignee: Kabushiki Kaisha Toshiba, Kawasaki, Japan

[21] Appl. No.: 870,898

[22] Filed: Jun. 5, 1986

[30] Foreign Application Priority Data

Jun. 28, 1985 [JP] Japan .............................. 60-142140

[51] Int. Cl.[4] .............................. G01D 15/12

[52] U.S. Cl. .............................. 346/74.2; 346/74.5; 360/122

[58] Field of Search .............................. 346/74.2, 74.5, 139 C; 360/110, 113, 119–122, 125–127; 400/119; 101/DIG. 5; 29/603; 427/48

[56] References Cited

U.S. PATENT DOCUMENTS 3,816,840 6/1984 Kotz .............................. 346/74.5

FOREIGN PATENT DOCUMENTS 55-30228 9/1980 Japan .............................. 346/74.5

*Primary Examiner*—Arthur G. Evans

*Attorney, Agent, or Firm*—Oblon, Fisher, Spivak, McClelland & Maier

[57] ABSTRACT

A method is disclosed which manufactures a recording head adapted to be moved relative to a recording medium, which is comprised of a conductive substrate and dielectric layer formed on the conductive substrate, to permit data to be recorded on the recording medium with the use of a conductive/magnetic toner on the recording medium. A conductive/magnetic sheet is attached to an insulating substrate of a first size with an adhesive layer therebetween, the first size of the insulating substrate is greater than a second size thereof defined by an insulating substrate of a finally completed recording head. The conductive/magnetic sheet is selectively etched to form an array of slits at a predetermined interval with both ends of the slits located beyond the side edges of an insulating substrate of a finally completed recording head. At one side edge portion of the conductive/magnetic sheet the conductive/magnetic sheet is electroplated to form a plated layer for a bonding pad. Those areas of the conductive/magnetic sheet, plated layer and insulating substrate, which are located beyond the side edge of the insulating substrate of the finally completed recording head, are cut to form a parallel array of electrodes and a bonding pad on one side edge portion of the conductive/magnetic electrodes.

8 Claims, 21 Drawing Figures

MAGNETIC RECORDING HEAD AND METHOD FOR MANUFACTURING

BACKGROUND OF THE INVENTION

This invention relates to a recording head and method for manufacturing the same, and in particular a recording head adapted to be moved relative to a recording medium, which is comprised of a conductive substrate and a dielectric layer formed on the conductive substrate, to permit data to be recorded on the recording medium with the use of a conductive/magnetic toner on the recording medium and method for manufacturing the same.

A recording head of this type is disclosed, for example, in U.S. Pat. No. 3,816,840. The head is comprised of a nonmagnetic insulating substrate and a plurality of needle-like electrodes made of a conductive/magnetic material. In the manufacture of the recording head it is necessary to precisely form the electrodes to a predetermined configuration. It is also necessary to manufacture a highly reliable recording head which can prevent the conductive/magnetic electrodes from being dropped from, and peeled off, the insulating substrate. It is again necessary to prevent the electrodes from being peeled off during insulating substrate during the service of the recording head.

SUMMARY OF THE INVENTION

An object of this invention is to provide a method for manufacturing a recording head whose conductive/magnetic electrodes are precisely formed to a predetermined configuration.

Another object of this invention is to provide a method for manufacturing a recording head which can prevent electrodes, made of a conductive/magnetic material, from being dropped from, or peeled off, an insulating substrate.

Another object of this invention is to provide a recording head which can prevent electrodes, made of a conductive/magnetic material, from being peeled off an insulating substrate during the service of the electrodes.

In order to attain the aforementioned object, there is provided a method for manufacturing a recording head according to this invention, which comprises the steps of:

attaching a conductive/magnetic sheet to an insulating substrate of a first size with an adhesive layer therebetween, the insulating substrate having the first size greater than a second size thereof defined by an insulating substrate of a finally completed recording head;

selectively etching the conductive/magnetic sheet to form a plurality of slits at a predetermined interval, both ends of the slits sheet being located beyond a side edge of the finally completed recording head, remaining portions of said conductive/magnetic sheet being electrically connected each other;

electroplating the conductive/magnetic sheet at one side edge portion thereof receding from the corresponding side edge of the finally complete recording head to form a plated layer for a bonding pad, the one side edge portion of the conductive/magnetic sheet intersecting one end portion of slits, the other side edge portion of the conductive/magnetic sheet being used as a common electrode in the electroplating step; and removing those areas of the conductive/magnetic sheet, the plated layer and the insulating substrate, which are located beyond the side edge of the insulating substrate of the finally completed recording head, to form a parallel array of conductive/magnetic electrodes and a bonding pad on the one side edge portion of the electrodes.

A recording head according to this invention comprises:

an insulating substrate;

an adhesive layer formed on the insulating substrate;

a parallel array of electrodes formed on the adhesive layer and made of a conductive/magnetic material;

a protective layer, formed at at least one side edge portion of the electrode, for preventing the electrodes from being peeled off the rest of the recording head, the protective layer being comprised of a first portion provided on one side portion of the electrodes and a second portion provided on the other end portion of the electrodes; and a bonding pad formed on exposed portions of the electrodes in the neighborhood of the first portion of the protective layer.

BRIEF DESCRIPTION OF THE DRAWINGS

Other objects and advantages will be apparent from the following description when taken in conjunction with the accompanying drawings in which.

DETAILED DESCRIPTION OF THE PREFERRED EMBODIMENTS

A method for manufacturing a recording head will now be explained below, as one aspect, with reference with FIGS. 1A to 1D and FIGS. 2A to 2D.

Figure 1A:
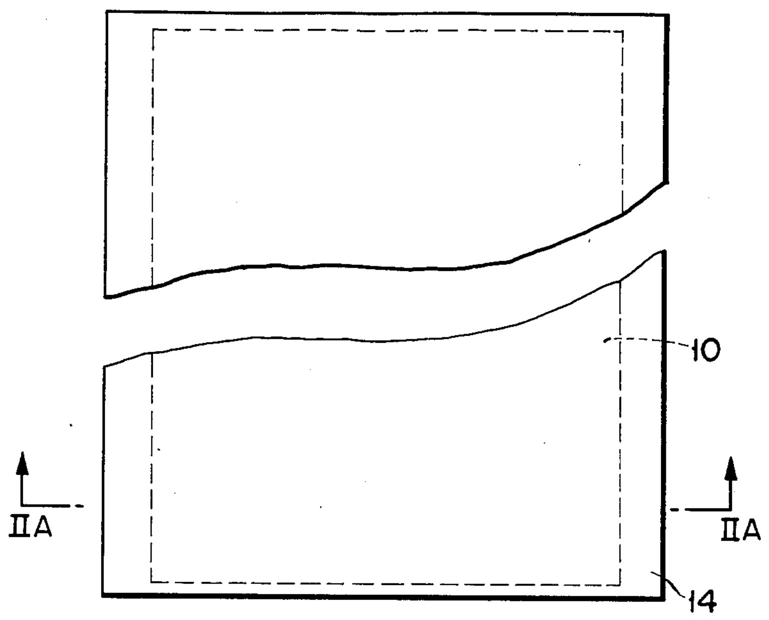
FIGS. 1A to 1D, each, are plan views for explaining a method for manufacturing a recording head according to a first embodiment of this invention.
Figure 2A:
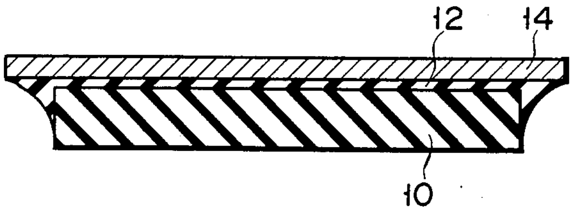
FIGS. 2A to 2D are cross-sectional views, taken along lines IIA—IIA, IIB—IIB, IIC—IIC and IID—IID of FIGS. 1A to 1D, respectively.

Insulating adhesive layer 12 is formed on glass substrate 10, as shown in FIGS. 1A and 2A and Fe-Co sheet 14 of, for example, 50 μm in thickness, which is greater in dimension than glass substrate 10, is attached, as a conductive/magnetic sheet, to insulating adhesive layer 12. Then, a resist pattern having a plurality of slits is formed by a photoetching method (not shown).

Figure 1B:
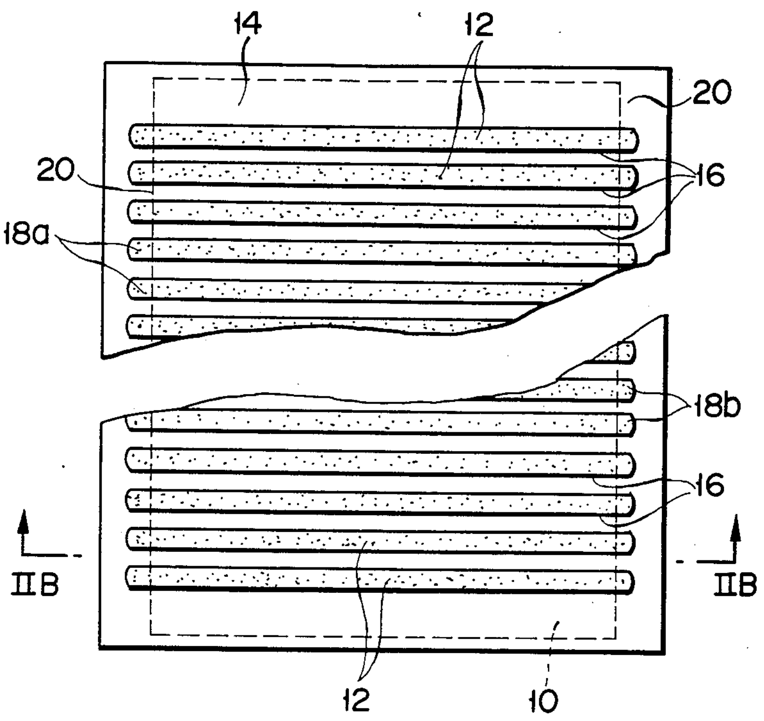
Figure 2B:
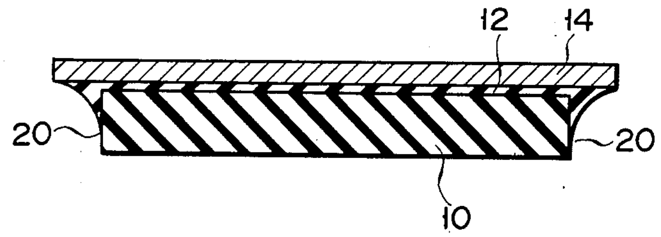

As shown in FIGS. 1B and 2B, an etching solution is blown onto Fe-Co sheet 14 with the resist pattern as a mask, causing Fe-Co sheet 14 to be selectively etched to form a plurality of slits of, for example, 50 μm in width on Fe-Co sheet 14 at an interval of 50 μm. At this step the insulating adhesive layer 12 as an underlying layer indicated as dotted regions in FIG. 1B is exposed at the bottom of slits 16. Both end portions 18*a,* 18*b* of the slit are projected beyond side edges 20 of glass substrate 10. The resist pattern is peeled off the resultant structure after the slits have been formed.

Figure 1C:
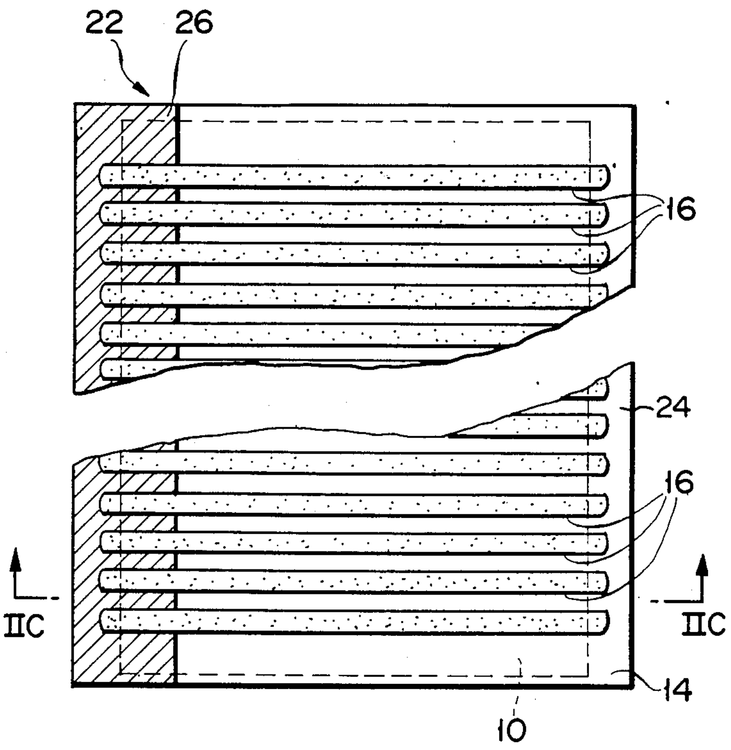
Figure 2C:
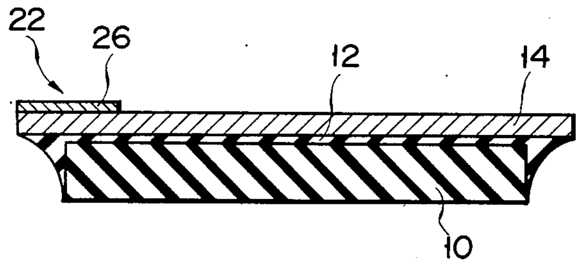
Figure 1D:
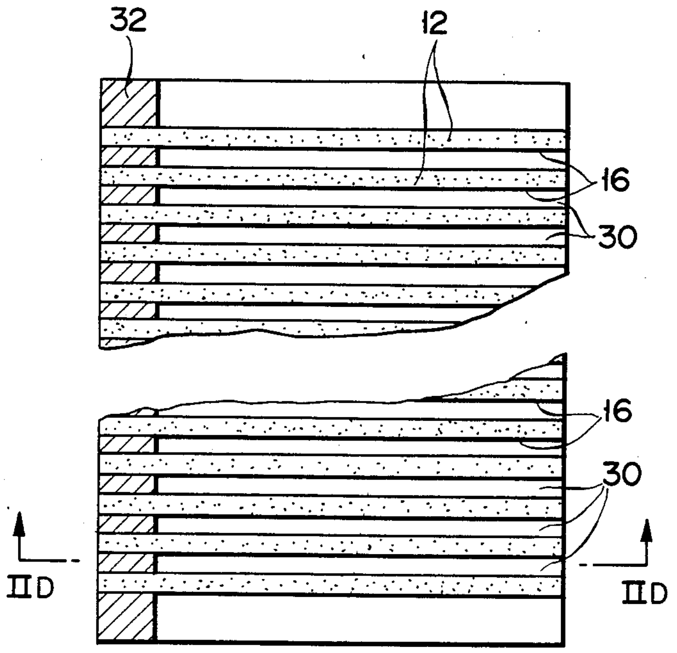
Figure 2D:
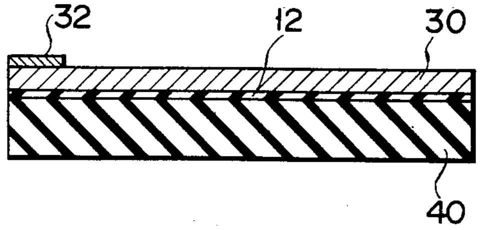

One longitudinal side edge portion 22 of Fe-Co sheet 14, together with glass plate 10, is initially nickel-plated and then dipped into a gold plating solution. As shown in FIGS. 1C and 2C, that portion of the resultant structure is electroplated, with frame-like portion 24 of Fe-Co sheet 14 as a common electrode, to form gold-plated layer 26 (indicated by the cross-hatched area in FIG. 1C) for a bonding pad, noting that framelike portion 24 are left with slits 16 formed there and that gold-plated layer 26 is formed on said one longitudinal side edge portion 22 of Fe-Co sheet 14 which recedes from glass plate 10.

Fe-Co sheet 14, gold-plated layer 26 and insulating adhesive layer 12 are cut along the side of glass substrate 10 and polished. It is to be noted that the final size of glass substrate 40 is substantially equal to the size of glass substrate 10 initially prepared. This recording head comprises glass substrate 40, Fe-Co electrodes 30 (conductive/magnetic material) formed in a parallel fashion relative to glass substrate 40, adhesive layer 12 and bonding pad 32 formed to the right of Fe-Co electrodes 30.

According to this embodiment, conductive/magnetic sheet (Fe-Co sheet) 14 is formed to have a dimension greater than that of glass substrate 10 and, in this case, slits 16 can be formed such that they extend beyond the side of the glass substrate. If conductive/magnetic sheet 14 is polished to the end of glass substrate 40, conductive/magnetic electrodes 30 can precisely be formed, thus improving an image resolution due to the recording head. It is also possible to prevent an uneven concentration of the image.

Since Fe-Co sheet 14 has a greater dimension than that of glass substrate 10, the adhesive can be prevented from flowing around onto the surface of Fe-Co sheet 14. It is therefore possible to prevent the contamination of Fe-Co sheet 14 by the adhesive. It is also possible to eliminate a build-up of the resist at the side of glass substrate 10.

Fe-Co electrodes are formed indirectly through the utilization of slits 16, not by a direct method. Gold plated layer 26 for a bonding pad is formed with the aforementioned frame-like portion 24 as a common electrode. This prevents conductive/magnetic sheet 14 from being peeled off during the manufacture of a recording head. As a result, the recording head can be manufactured in high yield which has highly-reliable conductive/magnetic electrodes free from the dropping of bits, short-circuiting, etc.

Although in the aformentioned embodiment the glass substrate has been formed as a substrate, any other insulating substrate, such as a ceramics substrate, may be used instead. The insulating substrate may be tapered at an edge portion thereof opposite to the edge portion where the bonding pad is formed.

Although in the aforementioned embodiment the Fe-Co sheet has been used as the conductive/magnetic sheet, any other conductive/magnetic sheet, such as an Fe-Ni alloy, may be used instead.

In the aforementioned embodiment, the conductive/magnetic electrodes have the same width, but the width of the conductive/magnetic electrodes can be made greater at the bonding pad formation area than at the remaining area to permit ready bonding.

Figure 3:
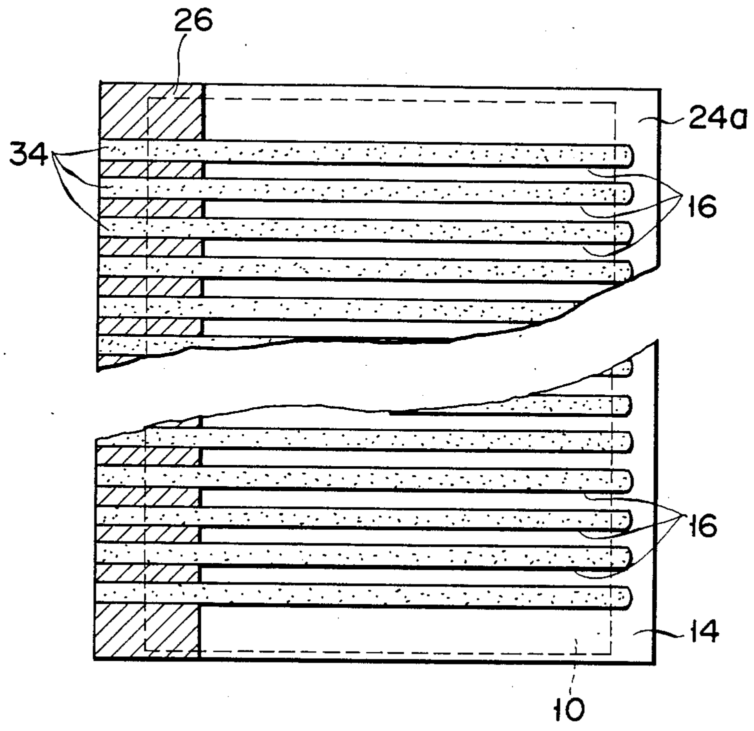
FIG. 3 is a plan view for explaining a method for manufacturing a recording head according to a second embodiment of this invention.

A method for manufacturing a recording head according to a second embodiment of this invention will be explained below with reference to FIG. 3. In the first embodiment, the plurality of slits were formed by etching with their both ends closed. In the second embodiment a plurality of slits, each, are so formed as to have an open end 34 on a bonding pad formation side. With one longitudinal side edge 24*a* of the resultant conductive/magnetic sheet used as a common electrode, gold-plated layer 26 can be formed on the other longitudinal side edge portion of the conductive/magnetic sheet. The other manufacturing steps are the same as in the first embodiment of this invention. In FIG. 3, identical reference numerals are employed to designate parts or elements corresponding to those shown in FIG. 1C and any further explanation is omitted.

A method for manufacturing a recording head according to a third embodiment will be explained below with reference to FIGS. 4A to 4D and 5A to 5D.

Figure 4A:
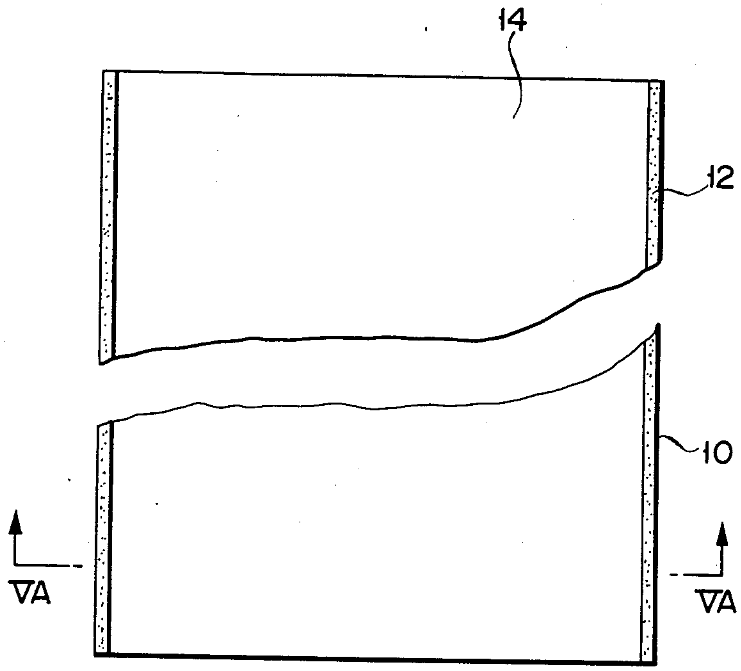
FIGS. 4A to 4D, each, are plan views for explaining a method for manufacturing a recording head according to a third embodiment of this invention.
Figure 5A:
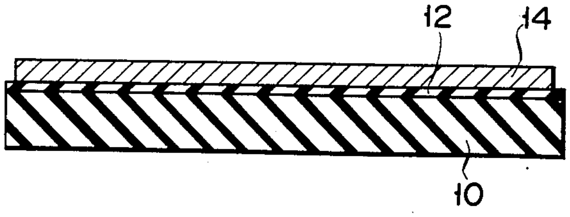
FIGS. 5A to 5D are cross-sectional views, taken along VA—VA, VB—VB, VC—VC and VD—VD of FIGS. 4A to 4D respectively.

As shown in FIGS. 4A and 5A, insulating adhesive layer 12 of 20 to 200 μm in thickness is formed on glass substrate 10. Fe-Co sheet 14 of, for example, 30 μm in thickness is attached, as a conductive/magnetic sheet, to adhesive layer 12. Fe-Co sheet 14 is formed such that it has a smaller dimension than that of glass substrate 10, but has a greater dimension than that of a substrate of a recording head finally completed. Then, a resist pattern having a plurality of slits is formed by a photoetching method (not shown).

Figure 4B:
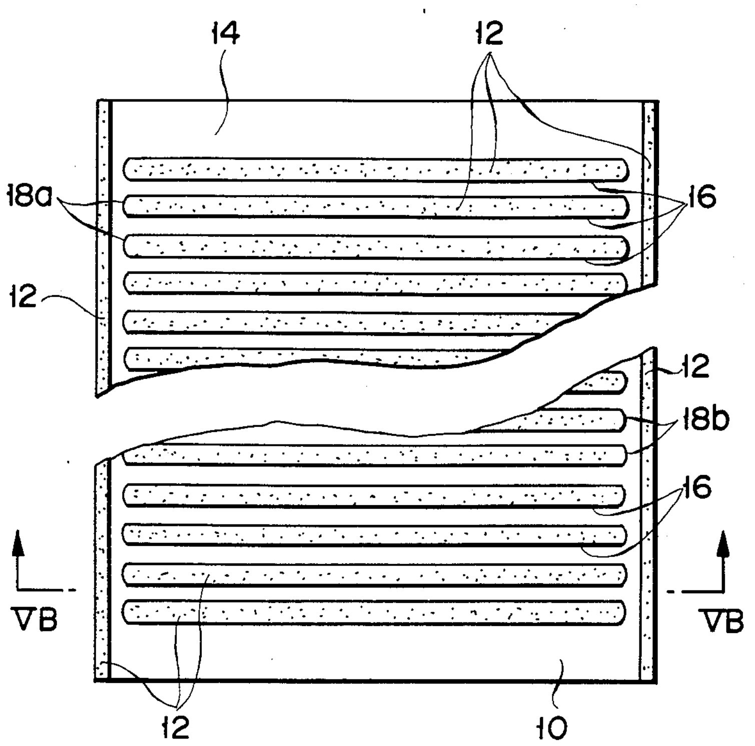
Figure 5B:
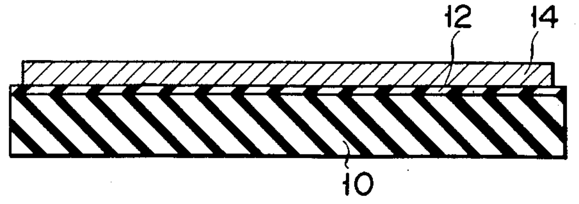

As shown in FIGS. 4B and 5B, with the resist pattern as a mask an etching solution is blown onto the resultant structure to form a plurality of slits at a pitch of 125 μm, each having, for example, 50 μm in width. At this step the insulating adhesive layer 12 as an underlying layer is exposed at the bottom of the slits. Both ends 18*a*, 18*b* of the respective slits 16 are formed such that they are located beyond the side edge of the final substrate of the recording head. After slits 16 have been formed, the resist pattern is peeled off the resultant structure.

Figure 4C:
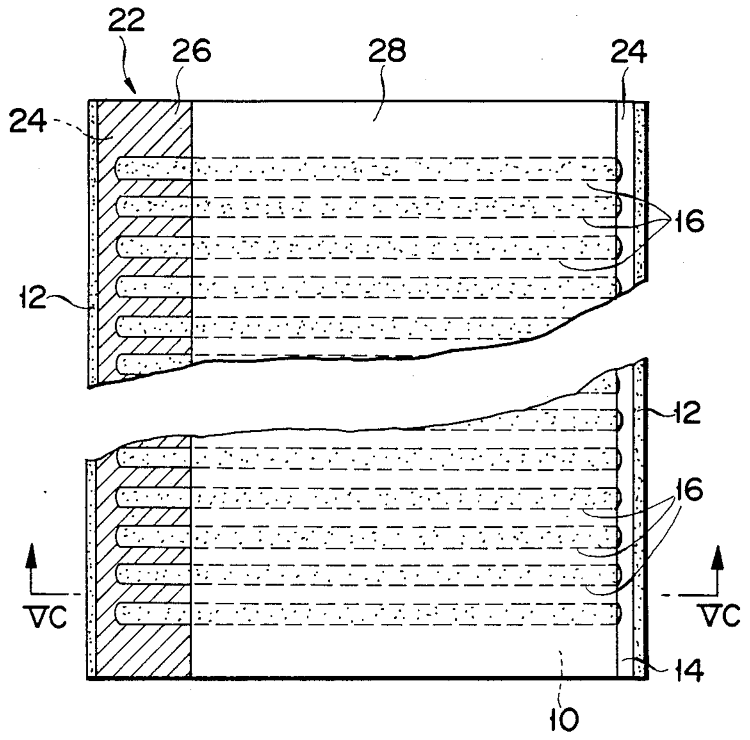
Figure 5C:
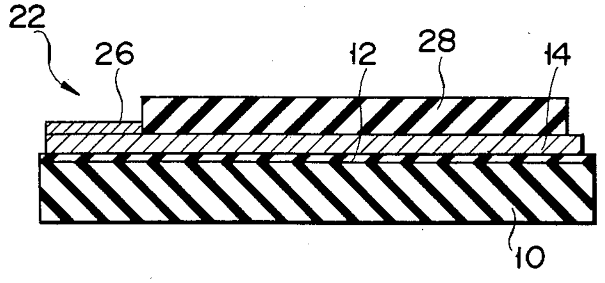

Then, a protective film, such as epoxy resin film 28, is formed on the surface of Fe-Co sheet 14, as shown in FIGS. 4C and 5C. Epoxy resin film 28 has a thickness of 20 to 200 μm and is formed with a bonding pad formation area left there. With epoxy resin film 28 as a mask one longitudinal side edge portion 22 of Fe-Co sheet 14, together with glass substrate 10, is initially Ni-plated, noting that said one longitudinal side edge portion 22 of Fe-Co sheet 14 recedes from the side edge of a substrate of a recording head finally completed. The resultant structure is dipped into a gold-plating solution. Electroplating is performed with frame-like portion 24 of Fe-Co sheet 14 used as a common electrode to form gold-plated layer 26 for a bonding pad.

Figure 4D:
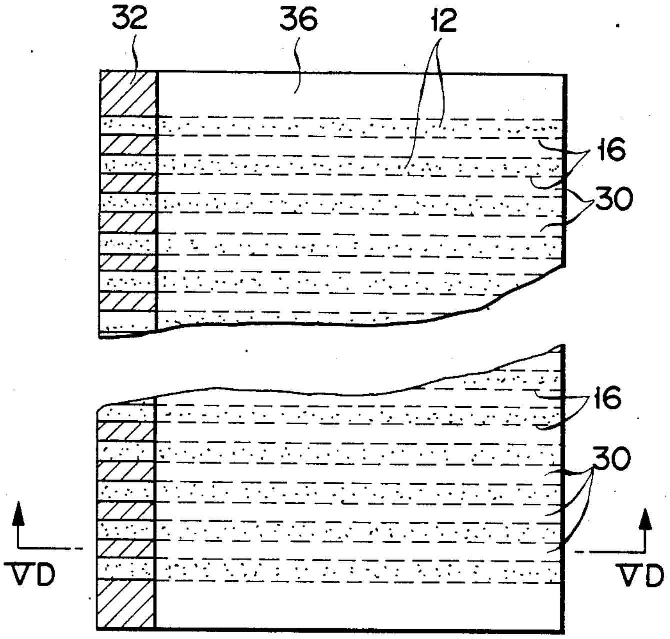
Figure 5D:
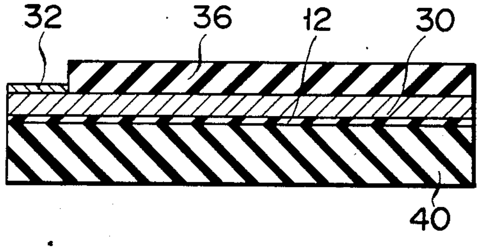

As shown in FIGS. 4D and 5D, glass plate 10, Fe-Co sheet 14 and gold-plated layer 26 are cut parallel to the outer side of glass plate 10 and polished, thereby removing frame-like portion 24 of Fe-Co sheet 14. In this connection it is to be noted that substrate 40 finally formed has a smaller size than that of the substrate initially prepared. In this way a recording head according to this invention is manufactured which comprises glass substrate 40, a parallel array of Fe-Co electrodes 30 formed relative to the glass substrate 40 and made of a conductive/magnetic material, bonding pad 32 formed to the right of Fe-Co electrode 30, adhesive layer 12 and protective film 36 covering Fe-Co electrode 36.

The aforementioned third embodiment can obtain the same advantage as the first embodiment of this invention. Furthermore, conductive/magnetic electrodes can be prevented from being peeled off the rest of the recording head because protective layer 36 is formed.

A method for manufacturing a recording head according to a fourth embodiment of this invention will be explained below with reference to FIGS. 6A and 6B and 7A and 7B.

Figure 6A:
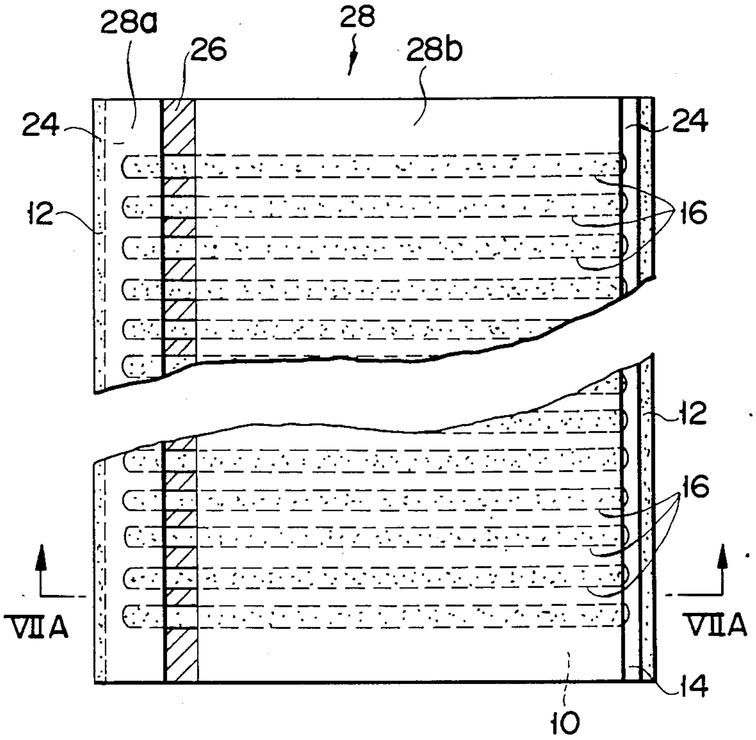
FIGS. 6A and 6B are plan views for explaining a method for manufacturing a recording head according to a fourth embodiment of this invention.
Figure 7A:
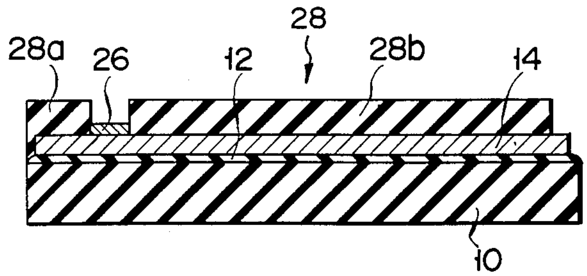
FIGS. 7A and 7B are cross-sectional views taken along lines VIIA—VIIA and VIIB—VIIB of FIGS. 6A and 6B, respectively.

After the slits have been formed as in the third embodiment, epoxy resin film 28 is formed on Fe-Co sheet 14 as shown in FIGS. 6A and 7A. The epoxy resin film is comprised of first portion 28*a* formed on one side and second portion 28*b* formed on the other side of Fe-Co sheet 14 with a bonding pad formation area exposed between first and second portions 28*a* and 28*b*. With first and second portions 28*a* and 28*b* as a mask, gold-plated layer 26 is formed in the same way as in the third embodiment.

Figure 6B:
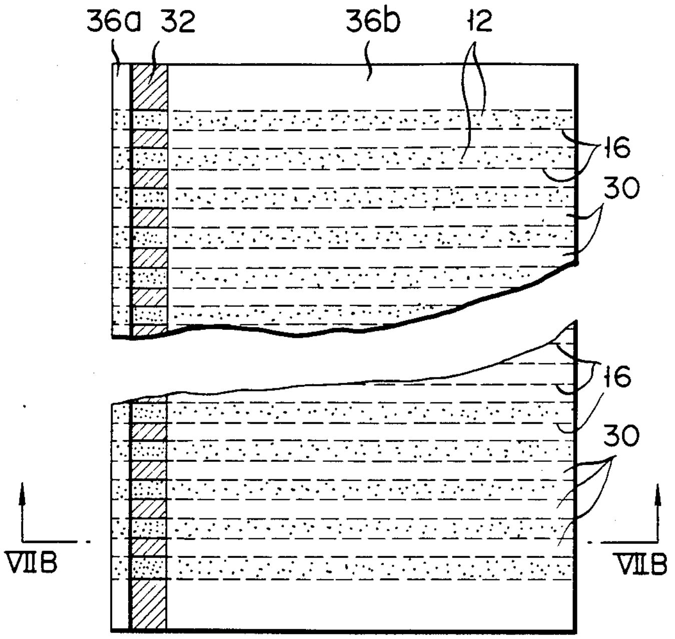
Figure 7B:
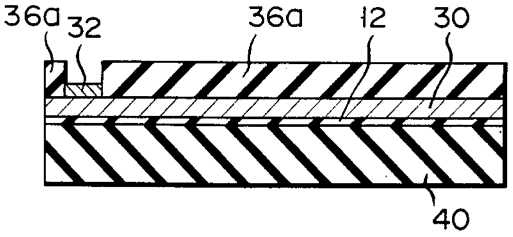

Then, as shown in FIGS. 6B and 7B, glass substrate 10, adhesive layer 12, Fe-Co sheet 14 and protective layers 28*a*, 28*b* are cut at their sides and polished, thereby removing frame-like portion 24 of Fe-Co sheet 14. In this way a recording head according to this invention is manufactured which comprises substrate 40 having a smaller dimension than that of substrate 10 initially prepared, adhesive layer 12, a parallel array of Fe-Co electrodes 30, bonding pad 32 and first and second protective films 36*a* and 36*b*.

If protective layers 28*a*, 28*b* are so formed, then the area of gold-plated layer 26 can be made as small as required and, furthermore, the conductive/magnetic electrodes 30 are prevented from being peeled off the rest of the recording head structure during the manufacture and service of these electrodes 30.

What is claimed is:

1. A method for manufacturing a recording head adapted to be moved relative to a recording medium, which is comprised of a conductive substrate and dielectric layer formed on the conductive substrate, to permit data to be recorded on the recording medium with the use of a conductive/magnetic toner on the recording medium, which comprises the steps of:

attaching a conductive/magnetic sheet to an insulating substrate of a first size with an adhesive layer therebetween, said insulating substrate having the first size greater than a second size thereof defined by that insulating substrate of a finally completed recording head;

selectively etching said conductive/magnetic sheet to form a plurality of slits at a predetermined interval, both ends of said slits being located beyond a side edge of said finally completed recording head, remaining portions of said conductive/magnetic sheet being electrically connected each other;

electroplating said conductive/magnetic sheet at one side edge portion thereof receding from the corresponding side of said finally completed recording head to form a plated layer for a bonding pad, said one side edge portion of said conductive/magnetic sheet intersecting one end portion of the slits, the other side edge portion of the conductive/magnetic sheet being used as a common electrode in the electroplating step; and removing those areas of said conductive/magnetic sheet, said plated layer and said insulating substrate, which are located beyond the side edge of the insulating substrate of said finally completed recording head, to form a parallel array of conductive/magnetic electrodes and a bonding pad on said one side edge portion of said electrodes.

2. The method according to claim 1, in which said second size of said insulating substrate of said finally completed recording head is smaller than said first size of said insulating substrate initially prepared.

3. The method according to claim 1, in which said second size of said insulating substrate of said finally completed recording head is substantially equal to said first size of said insulating substrate initially prepared.

4. The method according to claim 1, in which one end of each of said slits is opened at an outer edge of said conductive/magnetic sheet and a plated sheet is formed on said conductive/magnetic sheet at an area where said one end of the slit is located.

5. The method according to claim 1, further comprising the step of forming a protective film on said conductive/magnetic sheet and plated layer after said plated layer has been formed.

6. The method according to claim 1, further comprising the step of, subsequent to the formation of the slits, forming a protective film pattern on said conductive/-magnetic sheet, said protective film pattern being formed with a bonding pad formation area left there, and said plated layer being formed by an electroplating method with said protective film pattern as a mask.

7. The method according to claim 1, further comprising the step of, subsequent to the formation of said slits, forming a protective film pattern on said conductive/-magnetic sheet, said protective film pattern comprising a first portion provided at one side portion of said conductive/magnetic sheet and a second portion provided at the other side portion of said conductive/magnetic sheet, and said plated layer being formed by an electroplating method with said protective film pattern as a mask.

8. A recording head adapted to be moved relative to a recording medium, which is comprised of a conductive substrate and dielectric layer formed on said conductive substrate, to permit data to be recorded on the recording medium with the use of a conductive/magnetic toner on said recording medium, which comprises:

an insulating substrate;

an adhesive layer formed on said insulating substrate;

a parallel array of electrodes formed on said adhesive layer and made of a conductive/magnetic material;

a protective layer, formed at at least one side edge portion of the electrodes, for preventing said electrodes from being peeled off the rest of the recording head, said protective layer being comprised of a first portion provided on one side portion of said electrodes and a second portion provided on the other side portion of said electrodes; and a bonding pad formed on exposed portions of the electrodes in the neighborhood of said first portion of said protective layer.

* * * * *